(12) United States Patent
Malik

(10) Patent No.: US 6,252,954 B1
(45) Date of Patent: Jun. 26, 2001

(54) SYSTEM AND METHOD FOR DELAYING THE RINGING OF A LINE

(75) Inventor: Dale W. Malik, Dunwoody, GA (US)

(73) Assignee: BellSouth Intellectual Property Corporation, Atlanta, GA (US)

( * ) Notice: Subject to any disclaimer, the term of this patent is extended or adjusted under 35 U.S.C. 154(b) by 0 days.

(21) Appl. No.: 09/197,253

(22) Filed: Nov. 20, 1998

(51) Int. Cl.[7] ....................................... H04M 3/42
(52) U.S. Cl. ............................................... 379/207
(58) Field of Search ................................... 379/201, 207, 379/211, 212

(56) References Cited

U.S. PATENT DOCUMENTS

| 5,430,719 | 7/1995 | Weisser, Jr. . | |
|---|---|---|---|
| 5,469,500 | * 11/1995 | Satter et al. | 379/211 X |
| 5,867,568 | * 2/1999 | Ackerman et al. | 379/225 |
| 6,018,574 | * 1/2000 | Malik | 379/211 |

* cited by examiner

Primary Examiner—Creighton Smith

(74) Attorney, Agent, or Firm—Nora M. Tocups, Esq.; Kilpatrick Stockton; James L. Ewing, IV Esq.

(57) ABSTRACT

With respect to processing a communication, a method and system for delaying the ringing of a line until the status of the communication is determined when providing an advanced service. Upon transmitting the communication for forwarding to a forwarding number, a switch timer for a first predetermined time period is started at a first network element, such as a service node. Upon receiving the communication at the first network element, an acceptance timer for a second predetermined time period is started. The second predetermined time period is less than the first predetermined time period and may be referred to as the service node acceptance timer. During the processing of the communication, a determination is made as to whether the acceptance timer has expired. If so, then the communication may be accepted at the first network element and a ring signal may be played to the calling party. If the acceptance timer has not expired, then a determination is made as to whether the first network element has received status information from the forwarding number. If the first network element has received status information, then the communication may be accepted at the first network element and the appropriate status information, such as a busy signal or ringing, may be played to the calling party.

15 Claims, 3 Drawing Sheets

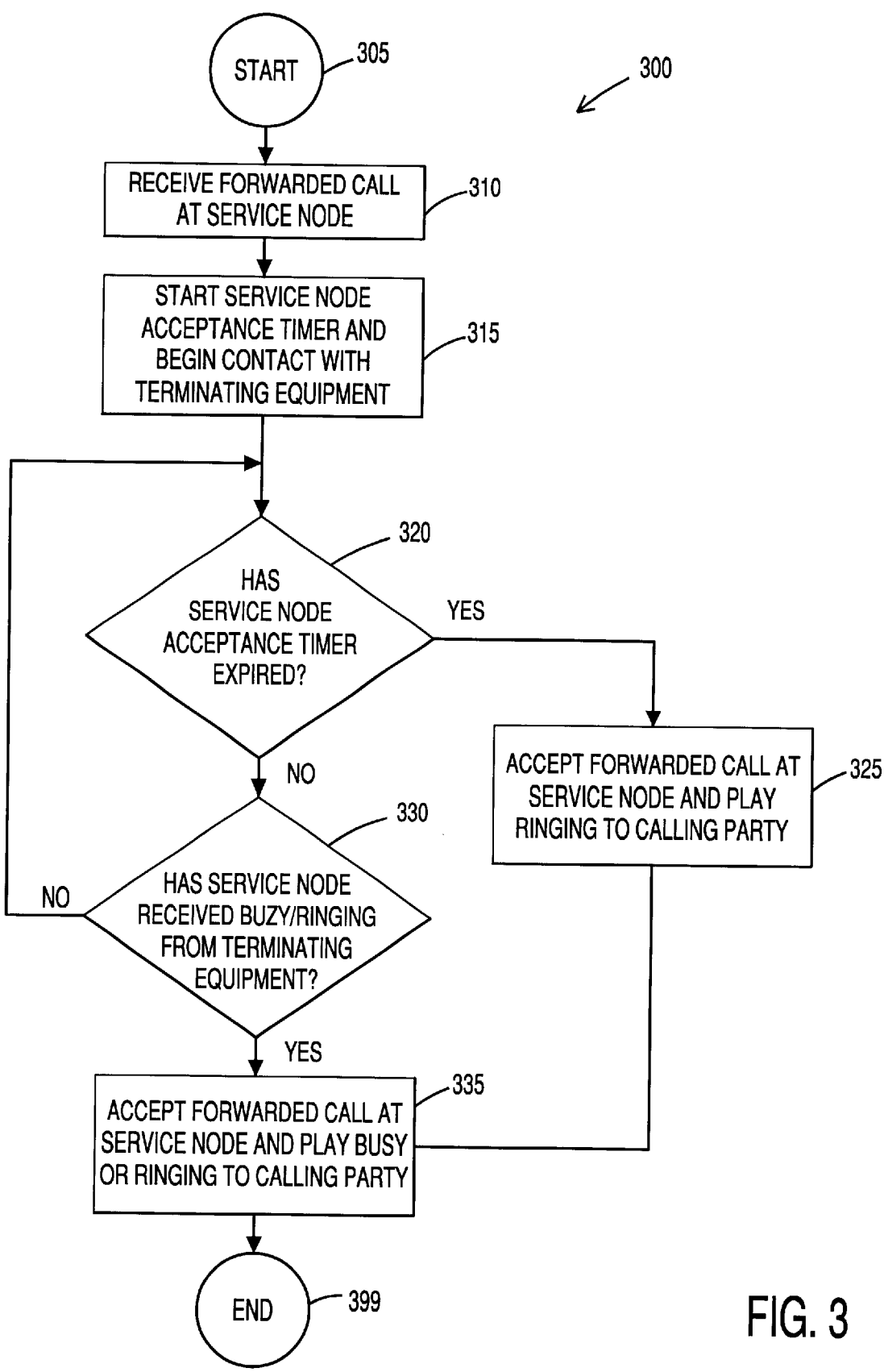

SYSTEM AND METHOD FOR DELAYING THE RINGING OF A LINE

TECHNICAL FIELD

The present invention relates generally to telecommunications systems, and more particularly, relates to a system and method for delaying the ringing of a line in a flexible call forwarding environment.

In the late 1970s and early 1980s, American Telephone & Telegraph Company (AT&T) developed an early species of common channel interoffice signaling (CCIS). CCIS is essentially a network architecture for a switched telephone network in which information about a telephone call is transmitted over high speed data links separate from the voice circuits used to transmit the signals of the call itself. Early in the development of CCIS, it was recognized that the interoffice data signaling links could be designed to provide high speed data regarding whether a call could be completed prior to assigning trunk capacity to set up the voice link, Thus, with CCIS the identity of the called number can be transmitted over the interoffice signaling data links from the originating central office to the terminating central office. The terminating central office is the central office that services the called number. If the called number is busy, then data providing this information is transmitted back over the interoffice signaling link to the originating central office that locally provides an audible busy signal to the caller. Therefore, no long distance trunk capacity is occupied during this process, and the voice circuits remain free for other uses. If the called number is not busy, various devices in the network respond to the information about this call to assign interoffice trunks to set up a connection for the call. While the call is being set up, the originating central office, based on a signal from the terminating central office, returns an audible ring back tone (RBT) to the caller. Once the called number is answered, an answer signal is passed from the terminating central office to the originating central office, the ring back tone is terminated, and the call is completed.

The public switched telephone network evolved in the 1980s to a complex and very versatile system, most of which supports and is controlled by a form of CCIS. The basics of this network were designed by AT&T. It is commonly referred to as the advanced intelligent network (AIN). Such an advanced intelligent network is shown in FIG. 1, and the AIN forms the environment of the present invention.

In the AIN, the same signaling path described above that is used for basic call set up, take down and routing, is also used to provide enhanced custom calling features and to control the operation of billing equipment and maintain billing records. One enhanced calling feature that may be delivered by the AIN is flexible call forwarding (FCF). When a subscriber/called party activates FCF, FCF automatically forwards an incoming call from a calling party to terminating equipment associated with a directory number that the called party has chosen. The called party may accept the call, reject the call, transfer the call, etc.

Any call directed to a subscriber's number is identified as a flexible call forwarded call by a query sent to the service control point of the AIN. Once the call is identified as a flexible call forwarded call, the service control point selects a service node (SN) to forward the call to in association with predefined destination terminating equipment to forward the call. The call is routed through a service switching point (SSP) (also referred o as an AIN central office) serving the service node, and then to the service node. The service node receives the call from its serving SSP (also referred to as hosting SSP) over an Integrated Service Digital Network (ISDN) interface. The service node may accept or reject the call from its serving SSP, and the service node provides an acceptance or rejection indication to its serving SSP. If the call is accepted by the service node, the public switched telephone network will seize a voice channel and provide RBT to the caller. The service node may choose to reject the call with a busy indication.

As described above, special handling of a call is necessary for an enhanced communication service, such as FCF. Special handling typically includes routing the call to a separate system or network element, such as a service node. The service node then handles the remainder of the call by interrupting the normal call flow from the calling party to the called party, implementing the subscriber's service, and reoriginating the call on the service node for completion of the call to the called party or other designated location.

One problem encountered with FCF is that the service node immediately accepts a call from a calling party before the call is connected to the called party. Thus, while the service node may be searching to locate the terminating equipment of the called party and receive an acceptance or rejection of the call from the called party, the calling party hears ringing and believes that the called party is not answering his or her telephone. Thus, the caller's perception of ringing begins the moment that the service node accepts the call although the called party's telephone has not begun to ring.

Another problem encountered with FCF is that the service node immediately accepts a call before the service node receives a busy or ringing tone from the called party's terminating equipment. As a result, the service node immediately plays ringing to the calling party regardless of whether the status of the called party's terminating equipment is busy. Thus, if the called party's telephone is busy, then the calling party may hear ringing and then hear a busy signal which can be annoying or confusing to the calling party.

Thus, in a flexible call forwarding environment, there is a need for a method and system that does not play ringing to the calling party until the call has been accepted or rejected by the far-end terminating equipment of the called party.

The present invention solves the above-described needs by providing a system and method for delaying the ringing to a calling party placing a call to a called party in a flexible call forwarding environment. The resolution to this issue is to use a settable timer to indicate when the service node should accept the flexible call-forwarded call. This timer, referred to as the service node acceptance timer, may allow the called party's acceptance or rejection of the flexible call-forwarded call to be detected by the service node before the service node's acceptance of the call. Instead of immediately causing ringing to be heard by the caller, the service node may detect the called party's terminating equipment as being busy and reject the call, resulting in a busy tone being played to the caller. Alternatively, the service node may detect the called party's acceptance of the call and start ringing to the calling party.

In one embodiment, the invention relates to a method or a system for delaying the ringing of a line until the status of the communication is determined when providing an advanced service. Upon transmitting the communication to a first network element, such as a service node, for forwarding to a forwarding number, a switch timer for a first predetermined time period is started. Upon receiving the communication at the first network element, an acceptance timer for a second predetermined time period is started. The second predetermined time period is less than the first predetermined time period and may be referred to as the service node acceptance timer. During the processing of the communication, a determination is made as to whether the acceptance timer has expired. If so, then the communication may be accepted at the first network element and a ring signal may be played to the calling party. If the acceptance timer has not expired, then a determination is made as to whether the first network element has received status information from the forwarding number. If the first network element has received status information, then the communication may be accepted at the first network element and the appropriate status information, such as a busy signal or ringing, may be played to the calling party.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3 is a flowchart illustrating a method for delaying ringing of a flexible call forwarded call in accordance with another embodiment of the present invention.

DETAILED DESCRIPTION

Figure 1:
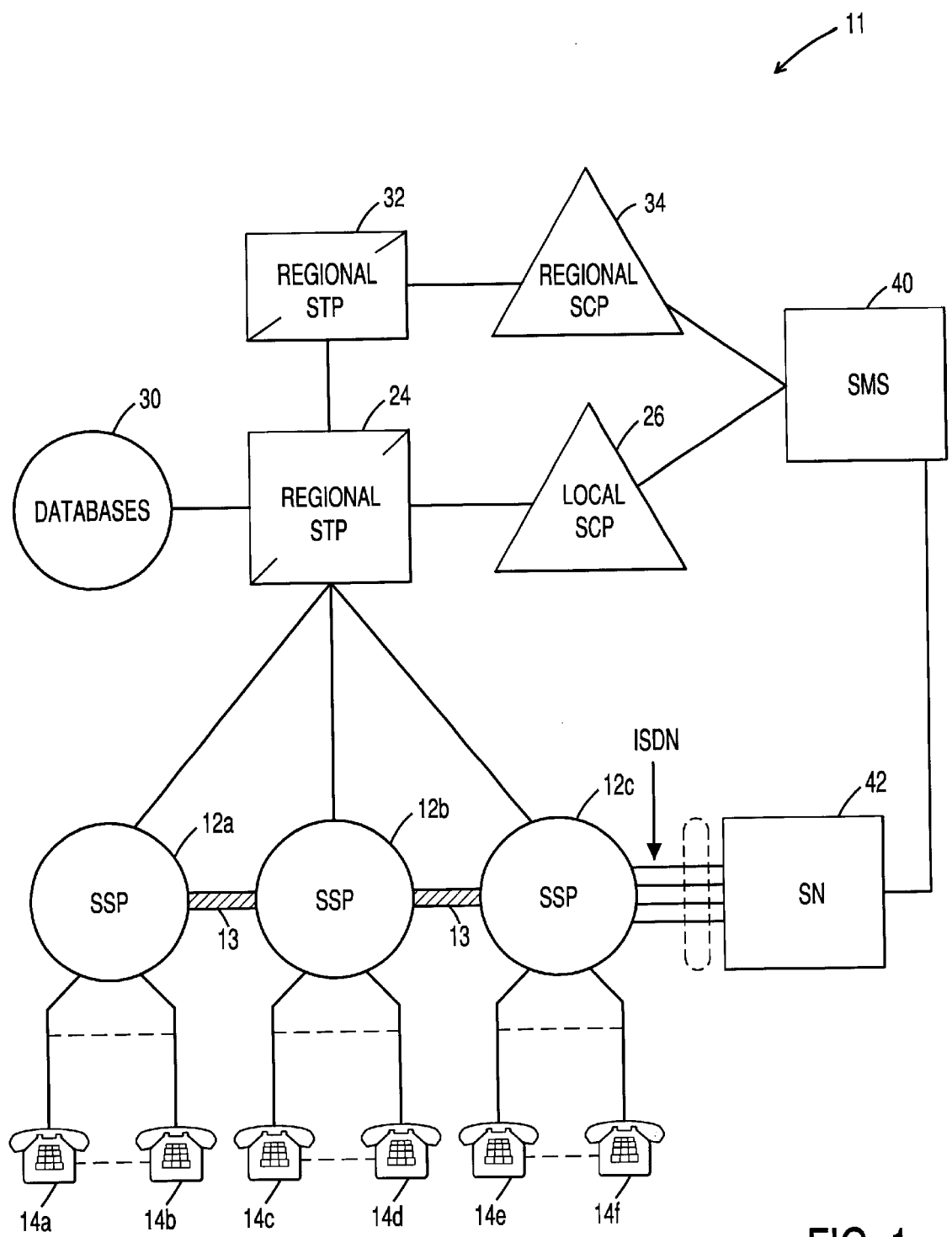
FIG. 1 is a diagram of an exemplary environment for operation of the present invention.

The present invention is directed to a system and method for delaying the ringing of a line in a flexible call-forwarding environment. In the prior art, a flexible call forwarded call was immediately accepted at a service node and ringing was immediately played to the calling party. Meanwhile, the service node awaited an alerting message or other type message to be sent from the terminating equipment of the forwarded number. Thus, sometimes the calling party would hear ring(s) before ringing actually occurred at the forwarded terminating equipment. The calling party may have believed that the called party was not answering their telephone when, in fact, the called party did not hear ringing or was engaged in another telephone conversation.

The present invention is directed to a system and method for delaying the ringing of a line in a flexible call-forwarding environment. In the prior art, a flexible call forwarded call was immediately accepted at a service node and ringing was immediately played to the calling party. Meanwhile, the service node awaited an alerting message or other type message to be sent from the terminating equipment of the forwarded number. Thus, sometimes the calling party would hear ring(s) before ringing actually occurred at the forwarded terminating equipment. The calling party may have believed that the called party was not answering their telephone when, in fact, the called party did not hear ringing or was engaged in another telephone conversation.

In one embodiment, the present invention employs a service node acceptance timer to delay acceptance of the flexible call forwarded call at the service node. Thus, the calling party does not hear ringing until the call is either accepted or rejected by the terminating equipment of the called party. Typically, the service node acceptance timer is defined in global service data. Prior to accepting the flexible call-forwarded call, the service node waits for the service node acceptance timer to expire. In that time, the service node would typically receive either a busy or ringing tone indicating the status of the terminating equipment. If the service node receives a busy tone from the terminating equipment, the service node rejects the flexible call-forwarded call, and a busy tone is played to the calling party. If the service node receives ringing from the terminating equipment, the service node accepts the call and causes ringing to be played to the calling party.

Thus, it should be understood that the present invention provides a method and system for closely synchronizing the ringing provided to a calling party with the ringing actually heard by the called party. In one embodiment, the flexible call forwarded call is accepted by the service node only after the service node acceptance timer expires, regardless of whether the call is accepted or rejected by the terminating equipment of the called party. In another embodiment, the service node acceptance timer is overrode if an alerting (acceptance) or rejection message is received from the terminating equipment of the called party; i.e., the service node receives acceptance or rejection before the service node acceptance timer expires.

Referring now to the drawings, in which like numerals represent like elements throughout the several figures, aspects of the present invention and exemplary operating environments will be described.

Exemplary Operating Environment Overview of AIN Elements

FIG. 1 is a diagram of an exemplary embodiment and exemplary environment for operation of the present invention. This exemplary environment is the public switched telecommunication network (PSTN). A portion 11 of the PSTN is illustrated in FIG. 1 and described generally below. In particular, the detailed portion 11 of the PSTN illustrates a part of the Advanced Intelligent Network (AIN) of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices which are indicated as service switching points (SSPs) 12a, 12b, 12c in FIG. 1. An SSP is a switch and the terms are used interchangeably herein. As further illustrated in FIG. 1, the SSPs 12a, 12b, 12c have a plurality of subscriber lines connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones designated as 14a–14f. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten-digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs 12a, 12b, 12c are interconnected by a plurality of trunk circuits 13. These are the voice path trunks that interconnect the SSPs to connect communications. The term "communication" or "call" is used herein to include all messages that may be exchanged between caller and called party in the network illustrated in FIG. 1. Each of the SSPs 12a, 12b, 12c is connected to another type of AIN element referred to as a local signal transfer point (STP) 24 via respective data links. Currently, these are data links employing a signaling protocol referred to as Signaling System 7 (SS7), which is well known to those skilled in the art. Much of the intelligence of the AIN resides in yet another type of AIN element referred to as a local service control point (SCP) 26 that is connected to STP 24 over a SS7 data link. Among the functions performed by the SCP 26 is the maintenance of network databases and subscriber databases as represented collectively by databases 30. These databases may be used in providing temporary telecommunication services to a customer. Typically, the SCP 26 is also the repository of service package applications (SPAs) that are used in connection with or as part of the databases 30 in the application of telecommunication services or enhanced features to calling lines.

As used herein, the phrase "telecommunication services" refers to features or enhancements that are provided by a telecommunication service provider to a customer in addition to conventional telephone service through the PSTN. A telecommunication service to which a customer subscribes in a conventional manner is typically subscribed to on an open-ended basis so long as the customer pays for the service.

Referring again to FIG. 1, the local STP 24 may be connected to other network elements of the PSTN through a regional STP 32, which in turn, may be connected to a regional SCP 34. Both regional SCP 34 and local SCP 26 are connected via respective data links to a service management system (SMS) 40. The SMS 40 interfaces to business offices of the local exchange carrier and interexchange carriers.

In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query its database for processing instructions with respect to the particular call. The results of the database inquiry are sent back to the SSP in a response from the SCP 26 through STP 24. The return packet includes instructions to the switch as to how to process the call. The instructions may be to take some special action as a result of a customized calling service or enhanced feature. In response, the switch moves through its call states, collects the called digits, and generates further packets that are used to set up and route the call. Similar devices for routing calls among various local exchange carriers are provided by regional STP 32 and regional SCP 34.

As illustrated in FIG. 1, the AIN also includes a service circuit node 42 (SCN), which may also be referred to herein as a service node (SN). SCN 42 includes voice and dual tone multi-frequency (DTMF) signal recognition devices and voice synthesis devices. SCN 42 is connected to the local SCP 26 via data link using an X.25 protocol and to the SMS 40 via a data link. In addition, SCN 42 typically is connected to one or more (but usually only a few) SSPs via Integrated Service Digital Network (ISDN) links as shown by the connection to SSP 12c.

Exemplary Operation

Exemplary operation of the present invention will now be described in reference to FIGS. 2–3 and the exemplary operating environment of FIG. 1.

It should be understood that the present invention is described in connection with a flexible call forwarding system. However, the present invention is equally applicable to any telecommunication system that receives calls via an ISDN interface and requires rerouting of the call, including, but not limited to, a forwarding or automatic transfer service.

Figure 2:
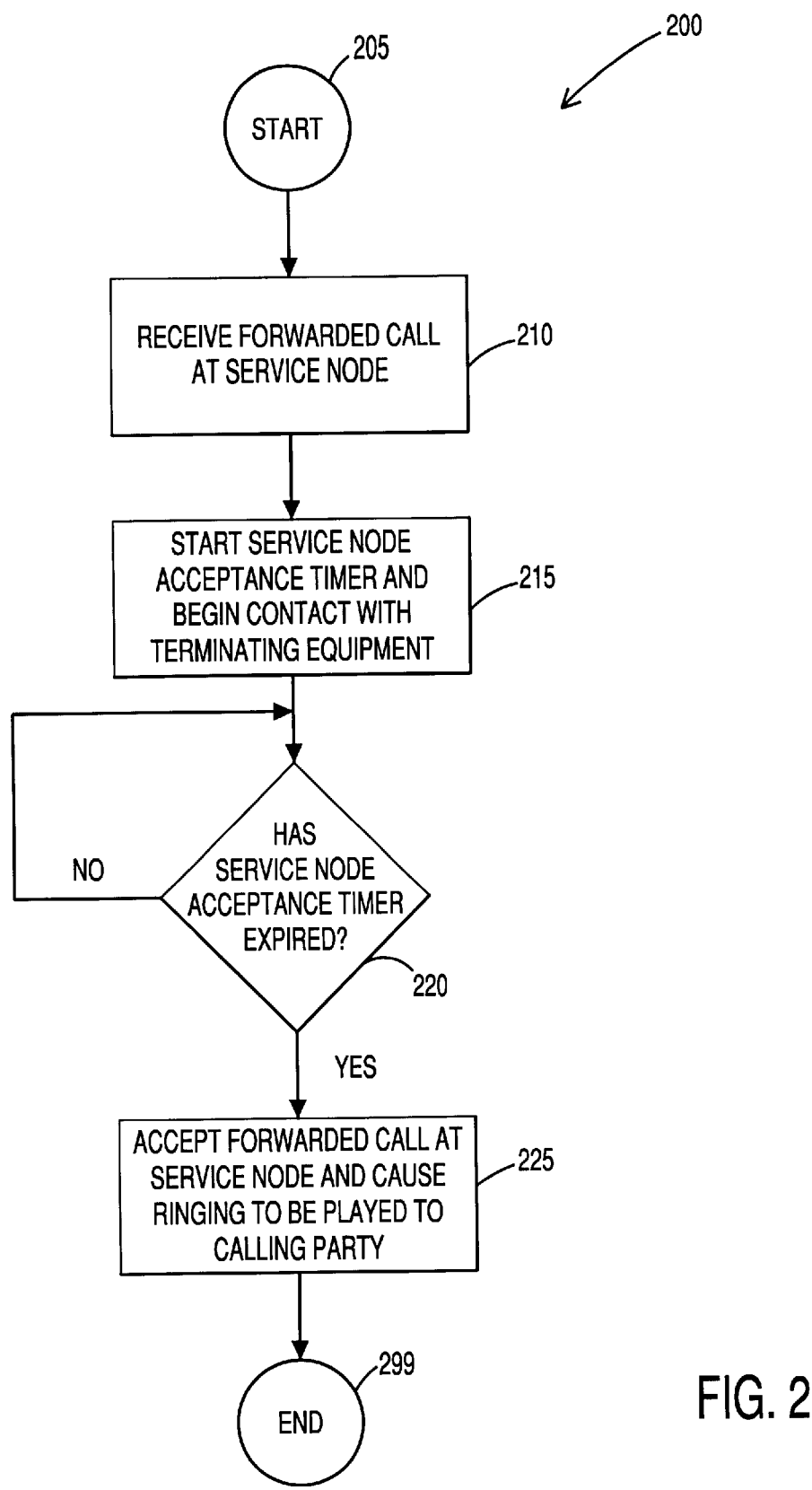
FIG. 2 is a flowchart illustrating a method for delaying ringing of a flexible call forwarded call in accordance with an embodiment of the present invention.

Referring now to FIG. 2, a flowchart illustrating a method 200 for delaying ringing of a flexible call forwarded call in accordance with an embodiment of the present invention will be described. The method 200 begins at start step 205 and proceeds to step 210 when a flexible call forwarded call is received at a service node from a service control point. For example, the calling party may be at telephone 14a and may be calling the called party's directory number associated with telephone 14b. The called party may have flexible call forwarding as an enhanced service feature and may have forwarded their calls to the directory number associated with telephone 14f. In that case, the flexible call forwarded call would be sent from SSP 12a to SSP 12c to service node 42. Service node 42 would be used to provide enhanced features, such as call screening, in connection with the flexible call forwarding service. Thus, the method 200 proceeds to step 210 when the flexible call forwarded call is received at the service node.

The service node receives the call at step 210, but does not accept the call in a normal fashion, such as by sending an acceptance message to the switch, or SSP, that transmitted the call to the service node. Instead, the method 200 proceeds to step 215. At step 215, a service node acceptance timer is started and the service node begins attempting to contact the called party's terminating equipment in a normal FCF manner known to those skilled in the art. The service node acceptance timer is a novel timer utilized in conjunction with the present invention to synchronize the ringing heard by the calling party with the ringing heard by the called party in a flexible call forwarding environment. The service node acceptance timer is typically set to a value slightly less than that of the "switch timer" associated with SSP 12c, or the switch which transmitted the call to the service node. "Switch timers" are well known to those skilled in the art and typically provide an amount of time by which a call must be accepted before the call will be considered to be a failure and a failure message will be provided to a user. Thus, for example, if the "switch timer" expires, a message will be played to the calling party that the call could not be connected due to a malfunction. Therefore, in the present invention, the service node acceptance timer is set to a value slightly less than the "switch timer" so that the service node acceptance timer expires before the "switch timer" does and so that the service node may accept the call upon expiration of the service node acceptance timer and before the call is rejected based on expiration of the "switch timer".

After a service node acceptance timer is started at step 215 and the service node begins attempting to contact the called party's terminating equipment in a normal FCF manner the method then proceeds to decision step 220.

At step 220, it is determined whether the service node acceptance timer has expired. If not, then the method 200 loops back to decision step 220 and it is determined again whether the service node acceptance timer has expired. When it is determined at step 220 that the service node acceptance timer has expired, then the method 200 proceeds to step 225.

At step 225, the flexible call forwarded call is accepted at the service node and ringing is played to the calling party. The method then ends at step 299. It should be understood that method 200 requires the expiration of the service node acceptance timer before the call is accepted by the service node regardless of whether an alerting (acceptance) or rejection message is received from the terminating equipment of the called party. In another embodiment described below in reference to FIG. 3, the present invention does take into account whether a message is received from the terminating equipment of the called party and will override the service node acceptance timer if a message is received before the service node acceptance timer expires.

Referring now to FIG. 3, a flowchart illustrating a method 300 for delaying ringing of a flexible call forwarded call in accordance with an embodiment of the present invention will be described. The method 300 begins at start step 305 and proceeds to step 310 when a flexible call forwarded call is received at service node 42. The service node receives the call, but does not accept the call in a normal fashion, such as by sending an acceptance message to the switch, or SSP, that transmitted the call to the service node. Instead, the method 300 proceeds to step 315. At step 315, a service node acceptance timer is started and the service node begins attempting to contact the called party's terminating equipment. The method then proceeds to decision step 320.

At decision step 320, it is determined whether the service node acceptance timer has expired. If not, then the method 300 proceeds to decision step 330. If it is determined at decision step 320 that the service node acceptance timer has expired, then the method 300 proceeds to step 325.

At step 325, the flexible call forwarded call is accepted at the service node and ringing is played to the calling party. The method then ends at step 399 and the service node continues to wait for receipt of a message from the called party's terminating equipment.

At decision step 330 it is determined whether the service node has received a message, such as an alerting message or rejection message, from the terminating equipment. If not, then the method 300 returns to decision step 320. If the service node has received a message, such as an alerting message or rejection message, from the terminating equipment, then the method proceeds to step 335.

At step 335, the call is accepted or rejected at the service node, and depending upon the message received from the called party's terminating equipment, causing a busy signal or ringing to be played to the calling party. The method then ends at step 399.

Thus, it should be understood that the present invention compresses the synchronization gap, i.e., the gap between acceptance of the call at the service node and acceptance or rejection of the call by the terminating equipment.

Alternative embodiments will become apparent to those skilled in the art to which the present invention pertains without departing from its spirit and scope. Accordingly, the scope of the present invention is defined by the appended claims rather than the foregoing description.

What is claimed is:

1. With respect to processing a communication, a method for delaying the ringing of a line until status of the communication with respect to the terminating equipment of the called party is determined when providing an advanced service, comprising:

upon transmitting the communication to a first network element for forwarding to a forwarding number, starting a switch timer for a first predetermined time period relating to failure or acceptance of the communication at the first network element;

upon receiving the communication at the first network element, starting an acceptance timer for a second predetermined time period, wherein the second predetermined time period is less than the first predetermined time period;

during processing of the communication, determining the acceptance timer has expired; and in response to determining the acceptance timer has expired, accepting the communication at the first network element prior to expiration of the first predetermined time, whereby the acceptance of the communication at the first network element after the acceptance timer has expired, but before the expiration of the first predetermined time, avoids the failure of the communication at the first network element.

2. The method recited in claim 1, wherein the processing of the communication comprises waiting for receipt of status information from the forwarding number; and further comprising:

prior to determining the acceptance timer has expired, receiving the status information; and transmitting the status information to a calling party of the communication.

3. The method recited in claim 2, wherein the status information comprises a busy signal or a ringing signal.

4. The method recited in claim 3, wherein the first network element comprises a service node.

5. The method recited in claim 4, wherein the advanced service comprises flexible call forwarding.

6. With respect to processing a communication, a method for providing information to a line of the communication when providing an advanced service, comprising:

starting an acceptance timer for a predetermined time period upon receiving the communication;

setting up the communication for forwarding to a forwarding number;

during set up of the communication, determining the acceptance timer has not expired;

receiving status information regarding the forwarding number; and if the status information comprises a rejection message, then rejecting the communication at a first network element.

7. The method of claim 6, further comprising:

transmitting the rejection message to the line of the communication.

8. The method of claim 6, further comprising:

causing a busy signal to be provided to the line of the communication.

9. The method of claim 6, further comprising:

if the status information comprises an acceptance message, then accepting the communication at a first network element.

10. The method of claim 9, further comprising:

causing a ring signal to be provided to the line of the communication.

11. With respect to processing a communication, a method for delaying a ring signal on a line when providing an advanced service, comprising:

starting an acceptance timer for a predetermined time period upon receiving the communication;

setting up the communication for forwarding to a forwarding number;

during the processing of the communication, determining whether the acceptance timer has expired; and in response to determining that the acceptance timer has expired, accepting the communication at a first network element and transmitting the ring signal on the line.

12. With respect to a communication terminated at a network element, a method to allow a delay in applying a ringing signal to the communication without invoking a failure message provided to calls that are not accepted within a first period of time, comprising:

receiving the communication at the network element, but not accepting the communication at the network element;

in response to receipt of the communication, setting an acceptance timer for a second period of time with the second period of time being less than the first period of time relating to the failure message;

monitoring for expiration of the second period of time; and upon the expiration of the second period of time, accepting the communication at the network element, whereby the ringing signal is provided to the communication as a result of the acceptance of the communication at the network element, but only after the delay substantially equivalent to the second period of time, and whereby the acceptance of the communication before the expiration of the first time period avoids provision of the failure message to the communication.

13. The method of claim 12, further comprising:

while monitoring for the expiration of the second period of time, receiving at the network element a rejection message relating to the communication; and in response to receipt of the rejection message, causing the network element to reject the communication so as to prevent the acceptance of the communication upon the expiration of the second period of time, whereby a rejection signal is provided to the communication resulting from the rejection of the communication at the network element, and whereby the rejection signal is provided without the ringing signal having been provided to the communication.

14. The method of claim 13, wherein the rejection signal comprises a busy signal.

15. The method of claim 12, further comprising:

while monitoring for expiration of the second period of time, receiving at the network element an acceptance message relating to the communication; and in response to receipt of the acceptance message, causing the network element to accept the communication prior to the expiration of the second period of time, whereby the ringing signal is provided to the communication resulting from the acceptance of the communication at the network element, but only after a delay without the communication having been provided the ringing signal.

* * * * *